(12) United States Patent
Wilson

(10) Patent No.: US 6,918,031 B2
(45) Date of Patent: Jul. 12, 2005

(54) SETTING CONDITION VALUES IN A COMPUTER

(75) Inventor: Sophie Wilson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 178 days.

(21) Appl. No.: 10/303,600

(22) Filed: Nov. 25, 2002

(65) Prior Publication Data
US 2003/0079108 A1 Apr. 24, 2003

Related U.S. Application Data

(63) Continuation of application No. 09/395,298, filed on Sep. 13, 1999, now Pat. No. 6,530,012.

(30) Foreign Application Priority Data

Jul. 21, 1999 (GB) .............................. 9917129

(51) Int. Cl.⁷ .......................... G06F 9/305; G06F 13/40
(52) U.S. Cl. ......................... 712/226; 712/22; 712/213; 712/227; 711/171; 710/307
(58) Field of Search .................. 712/22, 213, 226, 712/227, 245, 248, 235, 236; 711/171; 710/307

(56) References Cited

U.S. PATENT DOCUMENTS

| | | | | |
|---|---|---|---|---|
| 4,907,192 A | * | 3/1990 | Kaneko ....................... 712/236 |
| 5,072,364 A | * | 12/1991 | Jardine et al. .............. 712/215 |
| 5,471,593 A | | 11/1995 | Branigin ..................... 395/375 |
| 5,996,069 A | * | 11/1999 | Yasoshima et al. ......... 712/234 |
| 6,237,079 B1 | * | 5/2001 | Stoney ........................ 712/34 |
| 6,530,012 B1 | * | 3/2003 | Wilson ........................ 712/22 |

* cited by examiner

*Primary Examiner*—Daniel H. Pan
(74) *Attorney, Agent, or Firm*—Sterne Kessler Goldstein & Fox PLLC

(57) ABSTRACT

A method of executing instructions in a computer system on operands containing a plurality of packed objects in respective lanes of the operand is described. Each instruction defines an operation and contains a condition setting indicator settable independently of the operation. The status of the condition setting indicator determines whether or not multibit condition codes are set. When they are to be set, they are set depending on the results of carrying out the operation for each lane.

15 Claims, 3 Drawing Sheets

SETTING CONDITION VALUES IN A COMPUTER

This is a continuation of application Ser. No. 09/395,298, filed Sep. 13, 1999, now U.S. Pat. No. 6,530,012.

FIELD OF THE INVENTION

The present invention relates to a computer system for conditionally executing instructions, to an execution unit for use in the computer system and to methods of executing instructions.

BACKGROUND TO THE INVENTION

Computer systems are known where execution of an instruction is predicated on some value identified or addressed in the instruction. Computer systems are also known which act on so-called packed operands. That is each operand comprises a plurality of packed objects held in respective lanes of the operand. The degree of packing can vary and for 64 bit operands it is known to provide byte packing (eight objects per 64 bit operand), halfword packing (four objects per 64 bit operand) and word packing (two objects per 64 bit operand). With existing computer systems, when instructions defining such packed operands are predicated, the predication either causes the operation to be carried out on all of the operands or not to be carried out at all. Moreover, condition values are set depending on the results of the operation of an instruction.

There are computer systems where an instruction performs a particular test (e.g. compare for greater than) and sets a single bit for result true/false. Such instructions can be implemented on packed objects. For example, the packed compare instructions in the Intel MMX machine compare the corresponding data objects in the source and destination operands for equality or value greater than, respectively and generate a mask of ones or zeros which are written to the destination operand. Logical operations can use the mask to select elements. There is only a small group of such instructions, and these instructions always have the side effect of setting the true/false flags.

SUMMARY OF THE INVENTION

According to one aspect of the invention there is provided a method of executing instructions in a computer system on operands containing a plurality of packed objects in respective lanes of the operand wherein each instruction defines an operation and contains a condition setting indicator settable independently of the operation, the method comprising: determining the status of the condition setting indicator and, when the condition setting indicator is set; carrying out an operation specified in the instruction on each lane of the operand and generating a set of multibit condition codes depending on the results of carrying out the operation for each lane.

The arrangement according to the invention provides a number of advantages. In the first place, it provides a selectable ability to set condition codes alongside ordinary operations defined in an instruction. The condition setting indicator determines whether or not condition codes are set.

Moreover, the condition codes are multibit condition codes allowing for a number of different test conditions to be evaluated by subsequent instructions.

When the operand contains a maximum number N of packed objects, a condition code is individually generated for each lane whereby each set of condition codes contains N condition codes.

According to the following described embodiment, when operands contain less than the maximum number of packed objects (for example halfword or word packing), a condition code is generated for each lane of the operand and the value of that code is used to set two or more condition codes in the set of condition codes so that in the final set of condition codes there are N (the maximum number) of condition codes. This allows condition codes to be set on a lesser degree of packing and used by an operand with a greater degree of packing. In another embodiment, a condition code is set per lane of the packed operand so that the number of set condition codes depends on the degree of packing.

For a computer system which contains first and second execution channels, respective sets of condition codes can be generated for each execution channel.

The invention also contemplates accessing the condition codes in a subsequent instruction to determine on which lanes of the operand the operation specified in that subsequent instruction is to be carried out.

Another aspect of the invention provides a method of executing instructions in a computer system on operands containing a plurality of packed objects in respective lanes of the operand, the number of packed objects in the operand being less than the maximum possible number (N), the method comprising: carrying out an operation specified in the instruction on each lane of the operand and evaluating condition code values for each lane depending on the results of carrying out the operation for that lane; generating a set of condition codes containing a number of condition codes corresponding to the maximum possible number of packed objects in an operand by using the condition code value set for each lane of the operand to set two or more condition codes in the set of condition codes; and accessing each of said set of condition codes in a subsequent instruction which identifies an operand which is packed to a greater extent than the operand of the first instruction to determine on which lane of the operand for the subsequent instruction the operation specified in that subsequent instruction is to be carried out.

A further aspect of the invention provides a method of executing instructions in a computer system which comprises first and second execution channels, at least one instruction being executed on operands containing a plurality of packed objects in respective lanes of the operand, the method comprising: executing the instruction in the first execution channel by carrying out an operation specified in the instruction on each lane of the operand and generating a set of condition codes depending on the results of carrying out the operation for each lane; executing a subsequent instruction in the second execution channel including the step of accessing at least one of said set of condition codes to determine whether or not an operation specified in the subsequent instruction is to be carried out.

A further aspect of the invention provides an execution unit for use in a computer system for executing computer instructions, the execution unit comprising: first and second input stores for holding respective first and second operands on which an operation defined in the instruction is to be carried out, wherein each store defines a plurality of lanes each holding an object; a plurality of operators associated respectively with the lanes for carrying out an operation specified in the instruction on objects in corresponding lanes of the first and second source operands; a destination buffer for holding the results of the operation on a lane by lane basis; and a condition code generator for generating a set of condition codes depending on the results of carrying out the operation for each lane.

A further aspect of the invention provides a computer system comprising first and second execution channels, for carrying out respective operations; and a register file accessible by each of the first and second execution channels, said register file including a condition code register which holds a set of condition codes accessible by each of the first and second execution channels whereby a set of condition codes set by execution of an instruction in one of said execution channels is accessible by the other execution channel.

A further aspect of the invention provides a computer system comprising: a program memory holding a sequence of instructions for execution by the computer system, said instructions including a first instruction identifying at least one source operand containing a plurality of packed objects in respective lanes of the operand and having a condition setting field holding a condition set flag, and a second instruction which defines an operation to be executed and has a test field identifying a test code; at least one execution unit for executing said first and second instructions wherein pursuant to execution of said first instruction a set of condition codes are generated depending on the results of carrying out the operation for each lane of the operand if the condition set flag is set and wherein in execution of the second instruction the test code identified in the test field is compared with said condition codes to determine on which lanes of the operand the operation specified in the second instruction is to be carried out.

A further aspect of the invention provides a computer program product loadable into a computer system and comprising program code means including a sequence of instructions including: a first instruction identifying at least one source operand containing a plurality of packed objects in respective lanes of the operand and having a condition setting field holding a condition set flag, and a second instruction which defines an operation to be executed and has a test field identifying a test code, wherein when the computer program product is loaded into a computer system and the condition set flag inset, execution of the first instruction causes a set of condition codes to be generated depending on the results of carrying out the operation specified in the first instruction for each lane of the operand defined in the first instruction; and the second instruction conditionally implements the operation defined in the second instruction on individual lanes of the operand depending on the results of comparison of the test code identified in the second instruction with the generated set of condition codes.

For a better understanding of the present invention and to show how the same may be carried into effect, reference will now be made by way of example to the accompanying drawings.

DESCRIPTION OF THE PREFERRED EMBODIMENT

Figure 1:
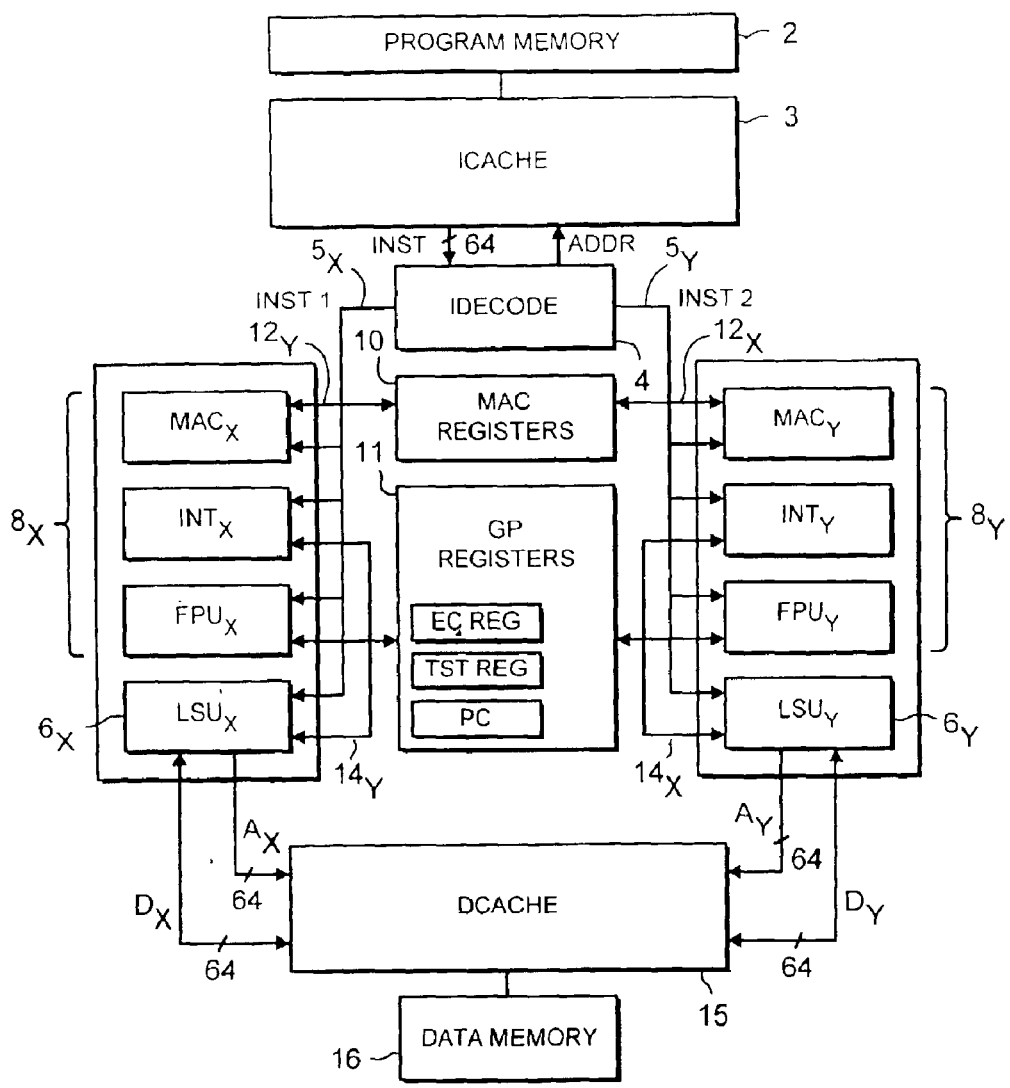
FIG. 1 is a schematic block diagram illustrating a processor.

The computer system described herein is schematically illustrated in FIG. 1 is a schematic diagram of the system. In FIG. 1, reference numeral 2 denotes a program memory which holds programs in the form of a plurality of instructions. The program memory 2 is connected to an instruction cache 3 which is connected to instruction fetch/decode circuitry 4. The fetch/decode circuitry issues addresses to the program memory and receives on each fetch operation a 64 bit instruction from the program memory 2 (or cache 3). Each 64 bit instruction can define two operations or a single operation. The decode unit 4 evaluates the opcode and transmits the appropriate control signals along X and Y channels $5_x,5_y$. Each channel comprises a SIMD execution unit $8_x,8_y$ which includes three data processing units, MAC, INT and FPU and a load/store unit LSU 6. Each data processing unit MAC, INT and FPU and the load/store units LSU operate on a single instruction multiple data (SIMD) principle according to the SIMD lane expressed in the instruction according to the following protocol which defines the degree of packing of objects for packed data processing operations:

| (B) | 8 bit objects ($b_0 \ldots b_7$) |
| (H) | 16 bit objects ($h_0 \ldots h_3$) |
| (W) | 32 bit objects ($w_0 \ldots w_1$) |
| (L) | 64 bit objects (l) |
| (S) | 32 bit floating point |
| (D) | 64 bit floating point |

For each channel $5_x,5_y$, if the instruction defines a data processing operation it is supplied to the appropriate data processing unit MAC, INT or FPU and if it defines a load/store operation it is supplied to the load/store unit LSU. Data values are loaded to and from the MAC data processing units into and out of a common register file 10 which includes sixteen 64 bit special purpose registers along with register access paths $12_x,12_y$. Data values are loaded to and from the INT and FPU data processing units and the load/store units LSU into and out of a second register file 11 which includes sixty-four 64-bit general purpose registers. Register access paths $14_x,14_y$ are provided for these accesses. The program counter PC which indicates the current instruction can be read via one of the general purpose registers (the PC register). Another one of the general purpose registers constitutes a control and status register. The general purpose registers also include a condition code register (CCreg) and a test register TSTreg which are discussed in more detail in the following.

Each register access path 12,14 carries three addresses from the accessing unit, two source addresses SRC1,SRC2 and a destination address DST. In the case of data processing operations, the source addresses SRC1,SRC2 define registers in the register files 10,11 which hold source operands for processing by the data processing unit. The destination address DST identifies a destination register into which a result of data processing will be placed. The operands and results are conveyed between the register file 10 or 11 and the respective data processing unit via the access paths 12,14. In the case of load/store operations, the instruction formats allow memory access addresses $A_x,A_y$ to be formulated from data values held in the registers as described in our copending Application No. (PWF Ref: 92472) as described later. The load/store units access a common address space in the form of a data memory 16 via a dual ported data cache DCACHE 15. For this purpose, each load/store unit has a 64 bit data bus Dx,Dy and a 64 bit address bus Ax,Ay.

The architecture supports two types of instruction, so called "long instructions" and "dual operation instructions".

Figure 2:
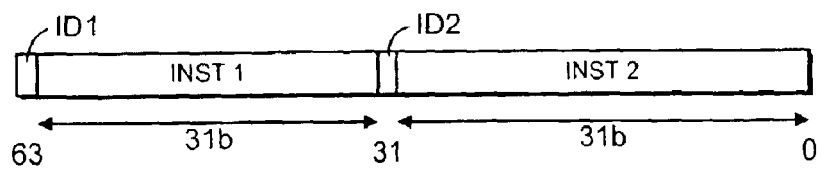
FIG. 2 is a diagram illustrating the encoding of two "packed" instructions.

Each 64 bit dual operation instruction defines two 31 bit operations in the manner illustrated in FIG. 2. That is, each 64 bit sequence contains two 32 bit instruction portions labelled INST1 and INST2. Each instruction also includes a designated set of identification bits which identify the type of each operation. There are two such bits in FIG. 2 at bit locations 31 and 63 denoted ID1 and ID2 in FIG. 2. In this embodiment operations are divided into data processing (DP) types or a load/store (LD/ST) types. The allowed combinations are two data processing operations (ID1,ID2 both set to "0"), two load/store operations (ID1,ID2 both set to "1") or one data processing and one load/store operation (ID1=0,ID2=1).

Figure 3:
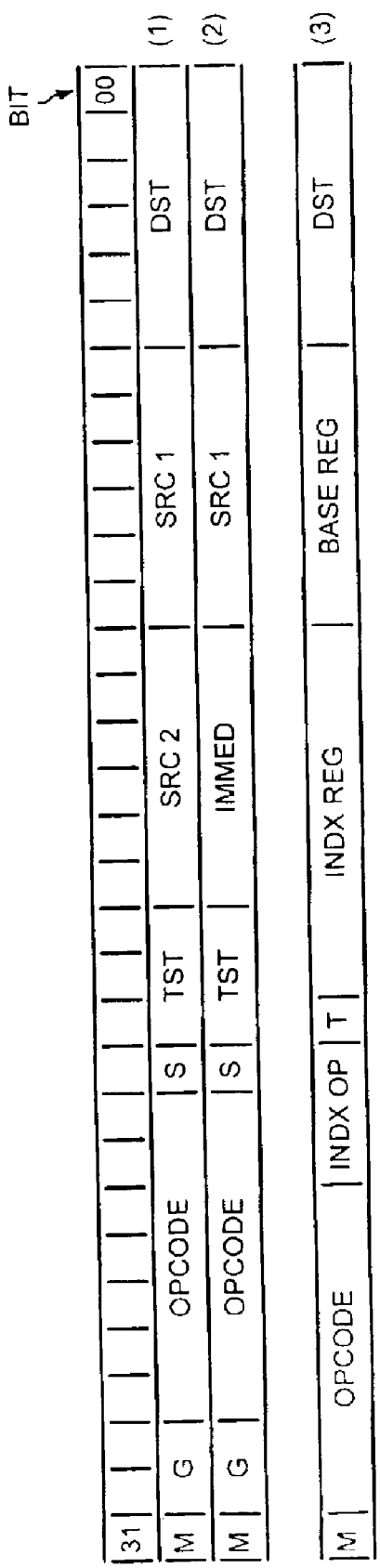
FIG. 3 illustrates a number of different 32 bit instruction formats.

FIG. 3 illustrates a number of basic formats for the 32 bit data processing portions of dual operation instructions. Each 32 bit operation requires the resources of one load/store unit, or one or more of the SIMD data processing units (MAC, INT, FPU) to execute. Thus, normally, two 32 bit operations can execute simultaneously, one in each of the X and Y channels. In the following, the X and Y channels are sometimes referred to as the right and left sides of the processor.

Format (1) defines register-register operations. Format (2) defines register-immediate operations. Format (3) defines a memory access operation. Memory access operations are not discussed further herein but it is noted that they are used to load data from memory into the register files and to provide store operations for the reverse.

The data processing instruction formats have the following fields in common. There are three identification bits, M (bit 31) and G (bits 29 and 30) which denote the nature of the data processing operation. An opcode field (bits 22 to 28) which defines the nature of the operation to be carried out, a condition setting field S (bit 21), a test register field (bits 18 to 20) and fields defining two source registers Src1,Src2 and a destination register Dst. Of course, format (2) does not include a field identifying a second source register, but instead holds an immediate value. As mentioned above, the registers in the register files 10,11 can hold a number of packed objects and in that case, normally, the operation defined in the opcode of the instruction will be carried out on each "lane" of the operand, that is on each pair of corresponding packed objects in respective source registers Src1,Src2 or source register and immediate value as the case may be.

As mentioned above, the general purpose registers 11 include CC registers and test registers. The test register holds a plurality of test bytes with each byte having a format as in FIG. 4, and the least significant byte set to zero. Each of these bytes will be referred to as a Treg byte [1 ... 7]. The Treg bytes are programmable and are set to the required values prior to instruction execution. The test register is used to allow conditional execution of instructions. Each instruction format contains a 3 bit TST field which allows a Treg byte [1 to 7] to be specified. If a Treg byte is not specified in the instruction, the TST field in the opcode is set to 0, and the instruction executes unconditionally. A specified byte can be modified using an ADL instruction of format (2) which adds a byte value specified in the immediate field to a specified SIMD lane defined in the TST field (Treg byte [1 ... 7]).

Figure 4:
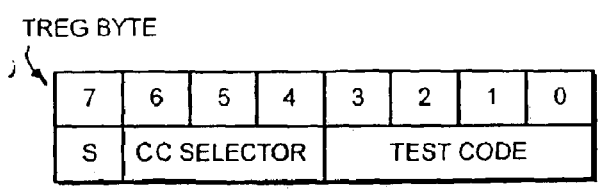
FIG. 4 illustrates the contents of a text register.

The 8-bit field of each Treg is as shown in FIG. 4.

The Condition field (bits 0 to 3) applies to all predicated instructions. It holds a 4 bit test code to allow for conditions to be tested. As discussed in more detail later, for instructions on packed objects, the condition applies to all the lanes on a per lane basis.

The four condition flags are:

N (Negative flag—bit 3)

Z (Zero flag—bit 2)

C (Carry flag—bit 1)

V (Overflow flag—bit 0)

These four bits give rise to 16 test conditions (see Table 1).

TABLE 1

| Opcode | Mnemonic | Meaning | Flags |
|--------|----------|---------|-------|
| 0000 | AL | Always execute | — |
| 0001 | EQ | Equal | Z |
| 0010 | NE | Not Equal | !Z |
| 0011 | CS | Carry Set | C |
| 0100 | CC | Carry Clear | !C |
| 0101 | MI | Negative | N |
| 0110 | PL | Positive or Zero | !N |
| 0111 | VS | Overflow | V |
| 1000 | VC | No Overflow | !V |
| 1001 | HI | Unsigned Higher | C.!Z |
| 1010 | LS | Unsigned Lower or Equal | !C + Z |
| 1011 | GE | Greater or Equal | N.V + !N.!V |
| 1100 | LT | Signed Less Than | N.!V + !N.V |
| 1101 | GT | Signed Greater Than | !Z.(N.V + !N.!V) |
| 1110 | LE | Signed Less than or Equal | Z.(N.!V + !N.V) |
| 1111 | Reserved | Reserved | Reserved |

The CC-Selector field (bits 4 to 6) applies only to instructions on non-packed objects. The CC-Selector field designates the condition code (in the CC register discussed later, which is to be compared with the code in the Treg Byte.

In the described embodiment, the Side field (S-bit 7, X=0, Y=1) applies only to non-SIMD 64-bit instructions. For 32-bit operations the side is decided according to the channel in which the instruction is being executed, irrespective of what the side field is set to. For non-SIMD 64-bit instructions, the side field designates either left or right (X or Y) condition codes in the CC register.

Figure 5:
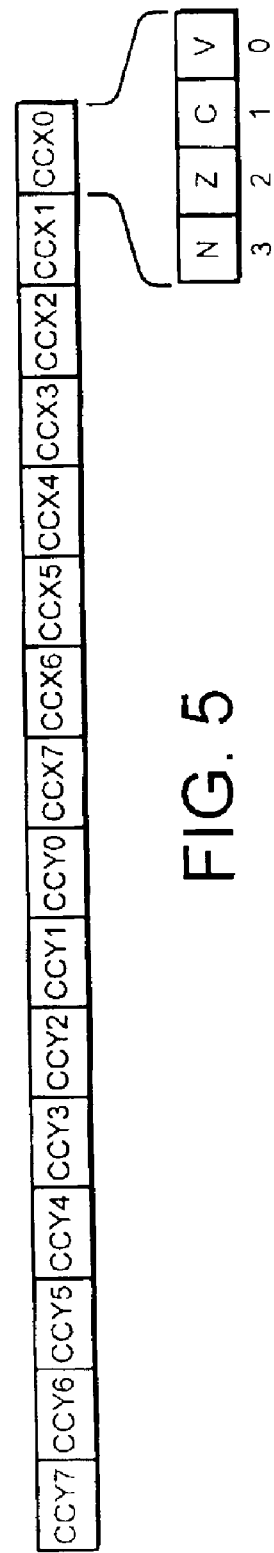
FIG. 5 illustrates the contents of a condition code register.

The Condition code register is 64 bits long and the bit fields are defined in FIG. 5. Each condition code is four bits long (a nibble).

Each CC{X,Y}{0 ... 7} nibble has the four condition flags (NZCV) in that order. The condition codes can be set and used on a per lane basis.

SIMD byte (B) operations update 8 condition codes, X or Y depending on the side of the machine.

CC{X,Y}0 ... CC{X,Y}7

SIMD halfword (H) operations update four pairs of condition code as follows (again depending on the sides of the machine). That is, two condition codes are updated with the same value for each operation.

| | |
|---|---|
| CCX0 = CCX1 | CCY0 = CCY1 |
| CCX2 = CCS3 | CCY2 = CCY3 |
| CCX4 = CCX5 | CCY4 = CCY5 |
| CCX6 = CCX7 | CCT6 = CCY7 |

SIMD word (W) operations update two quads of condition codes, as follows (depending on the side of the machine). That is four condition flags are updated to the same value for each operation.

CCX0 = CCX1 = CCX2 = CCX3   CCY0 = CCY1 = CCY2 = CCY3
CCX4 = CCX5 = CCX6 = CCX7   CCY4 = CCY5 = CCY6 = CCY7

SIMD longword (L) operations update all eight condition codes as follows (depending on the side of the machine).

CCX0=CCX1=CCX2=CCX3=CCX4=CCX5=CCX6=CCX7

CCY0=CCY1=CCY2=CCY3=CCY4=CCY5=CCY6=CCY7

Use of the test register and condition code register will now be described with reference to the following examples. It will be understood that the following are examples only used to illustrate the principles of operation.

Consider the arithmetic operation ADD. This instruction can be implemented in a register-to-register format using format (1) in FIG. 3, or in a register-to-immediate format using format (2) of FIG. 3. Only the register-to-register format is described in detail in the following to illustrate the principles of the use of the test registers and the condition code register.

The instruction ADD has the following semantics:

ADD{B|H|W|L}{S}{Treg,}Dest,Src1, Src2.

Considering format (1) in FIG. 3, this instruction thus defines two source registers in the fields SRC1 and SRC2, each source register containing operands for the addition operation. If the instruction is ADDL, the registers are not packed but each contains a 64 bit object. For the ADDB, ADDH and ADDW instructions, each source register contains a number of packed objects according to the degree of packing defined earlier. It is assumed in the following example that each source register holds eight packed objects $b_0 \ldots b_7$. A destination register DST is defined in the DST field of the instruction for holding the result of the addition operation. Eight packed objects are generated in the destination register. Assume for the time being that a single 32 bit operation is being effected by one channel (X or Y) of the processor.

Figure 6:
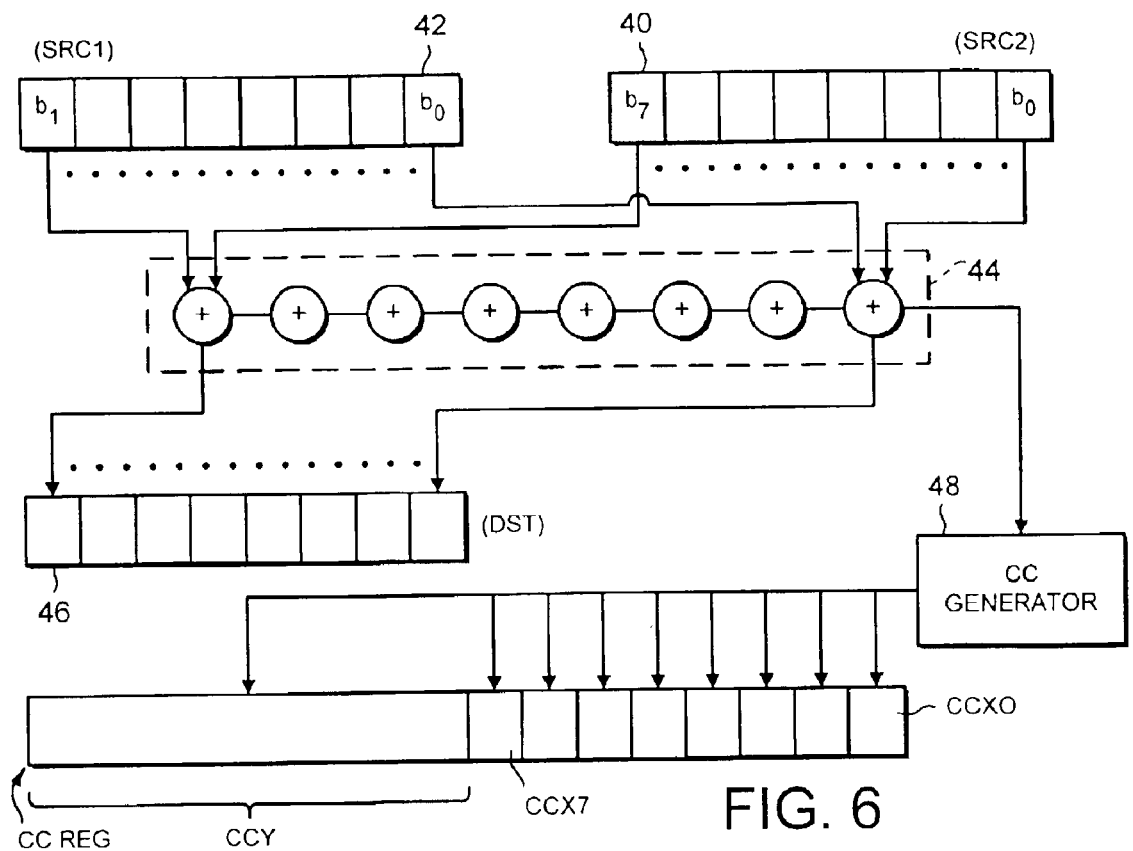
FIG. 6 is a diagram illustrating setting of condition codes.

FIG. 6 illustrates a diagram of one of the functional units which is capable of executing the ADD instruction. First and second 64 bit buffers 40,42 are provided for holding first and second source operands. In the illustrated example, the source operands contain eight packed objects $b_0$ to $b_7$ in each case. Addition circuitry 44 comprises eight operators, in this case addition circuits, each connected to receive two packed objects respectively from the same lane $b_0 \ldots b_7$ of the input buffers 40,42. Only the connections of the first and last objects are shown. Similar connections apply to each of the other addition circuits. An output buffer 46 holds the result which is likewise in the form of eight packed objects for loading into the destination register specified in the instruction. A condition code generator 48 also examines the results of each addition and generates condition codes for the side of the machine where the instruction is being executed to be held in the condition code register CCreg. The condition generator 48 always generates eight condition codes for each side of the machine regardless of the degree of packing of the source operands, as described more fully in the following.

The instruction format (1) contains an S flag (bit 21). If this flag is set, then the condition codes for the side of the machine in which the instruction is being executed are set. Assume in this example that the instruction is being executed on the X side of the machine. The condition code generator 48 generates condition codes CCX0 to CCX7 by considering the results of the addition operations which were carried out on each packed object in the source registers and determining from those operations the values of N,Z,C and V which are the bits defining each condition code. In the example of FIG. 6, a different condition code can be generated for each condition code location CCX0 . . . CCX7 in the condition code register. Condition codes are set as follows. The N flag of the condition code is set if the result is negative, that is the top bit is set (event for unsigned inputs). The Z flag is set if the result is zero. The C flag is set if the operation generated an output carry. The V flag is set if the operation overflowed its range before being wrapped or saturated.

If the S flag in the instruction is not set, the condition register is not updated.

For the above explanation it has been assumed that the addition operation was carried out. It is possible to predicate the ADD instruction itself on condition codes which have been set by an earlier instruction or instruction sequence. For this purpose, the instruction format contains a test register field TST (bits 18 to 20). These three bits allow one of the test register bytes Treg (1 . . . 7) to be addressed. If a test register byte is specified in the TST field of the instruction, then each condition code on the side of the machine where the instruction is being executed is checked against the condition code specified in the addressed Treg byte. If the TST field is set to zero, such that no Treg byte is specified, then the instruction always executes.

Figure 7:
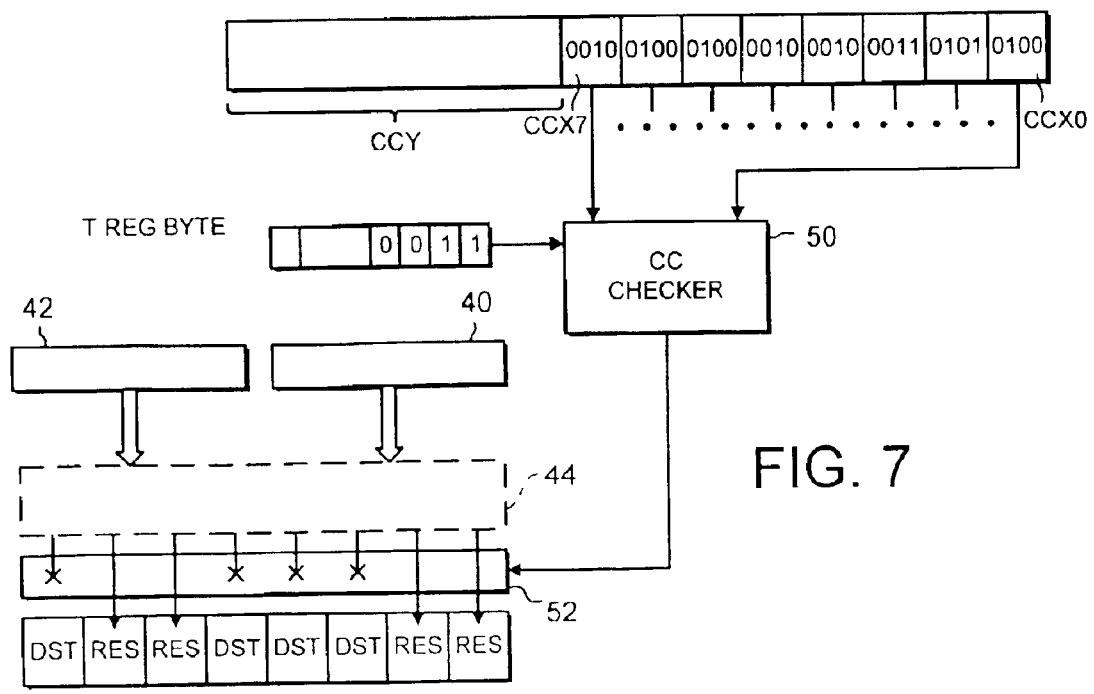
FIG. 7 is a diagram illustrating use of condition codes.

After comparing the test code specified in the addressed Treg byte with each of the condition codes CCX0 . . . CCX7 (assuming the operation is being executed on the X side of the machine), then the specified operation is carried out on the SIMD lanes where there is a match, and is not carried out on the SIMD lanes where there is no match. An example is illustrated in FIG. 7. Assume that the operation illustrated in FIG. 6 and described above has been carried out and that condition codes CCX0 to CCX7 have been set as described above depending on the results of the arithmetic operation in each of the SIMD lanes $b_0 \ldots b_7$. It is assumed for this example that the condition codes are: $b_0$ 0010, $b_1$ 0101, $b_2$ 0011, $b_3$ 0010, $b_4$ 0010 $b_5$ 0100. This is illustrated in the condition code register in FIG. 7. Let us also assume that the addressed test register byte in the TST field of the instruction holds the condition code 0011. This denotes the condition Carry Set C. SIMD lanes $b_0,b_2,b_3,b_4$ satisfy this condition. Assume that the subsequent operation to be carried out is also an ADD instruction operating on the byte packed contents of two source registers SRC1,SRC2 with the results to be loaded into a destination register DST. Because a test register byte has been specified, the addition operation is only effected on the SIMD lanes where the condition code set for that lane (CCX0 . . . CCX7) satisfies the condition defined by the test code set in the addressed Treg byte. This is determined by a condition code checker 50. The output of the condition code checker 50 controls a set of switches 52, one for each SIMD lane $b_0 \ldots b_7$. These switches control whether or not the results of the addition operation recited in the instruction update the values in the corresponding lane in the destination register DST. This is shown diagrammatically in FIG. 7, with a cross illustrating that the result of the addition operation does not get loaded into the destination register, and a through arrow illustrating that it does. This is denoted in the destination register by DST denoting an original byte in the destination register (that is prior to execution of the instruction), and RES denoting a result byte which, following execution of the instruction is a result of the arithmetic operation on that lane.

As mentioned above, when an instruction is to be executed on less densely packed objects, for example H or W, eight condition codes are still set, in pairs or quads as mentioned above. Assume for example that an operation is carried out on halfword packed objects $h_0 \ldots h_3$. The condition generator 48 determines condition code values by setting the N,C,Z and V flags as before for each SIMD lane. Thus, four condition code values are generated. These are used to set eight condition codes in the condition code register as condition code pairs as mentioned above. Once the condition codes have been set in the condition code register, they can be used in subsequent instructions operating on any degree of packing. For halfword packed objects, the first condition code CCX0 and every alternate condition code thereafter is checked against the test code in the addressed Treg byte to determine whether or not the instruction executes on that SIMD lane. For word packed objects, the first condition code and the fourth condition code is checked against the test code in the addressed Treg byte to determined whether or not the operation should be executed on that SIMD lane.

For long word operations, the first condition code CCX0 is evaluated. As described above, all condition codes for one side of the machine will have the same value set.

For non-SIMD instructions, that is instructions where the operands are not packed, the condition codes can still be used to determine whether or not the instruction is executed. In that case, the TST field of the instruction again identifies a Treg byte. The condition selector in the Treg byte identifies one condition code which can be on the right or left sides. The side bit S denotes which side of the machine (X or Y). That is, any condition code out of the sixteen condition codes CCX0 . . . CCX7, CCY0 . . . CCY7 can be identified by the condition selector. The code held in the condition bits 0 to 3 of the Treg byte is then tested against the selected condition code to determine whether or not the instruction is executed. If the test condition is satisfied the instruction is executed. If not, the instruction is not executed.

From the above description it will be appreciated that although the processor has right and left sides (X and Y channels), the condition code register is accessible from both sides. For 32 bit operations, condition codes are set and accessed according to the side of the processor which is actually processing the 32 bit operation. Thus, 32 bit operations processed in the X channel 5X update the condition codes for the X channel CCX0 . . . CCX7, and are executed conditionally only on the X channel codes CCX0 . . . CCX7. Similarly, for 32 bit operations being executed in the Y channel 5Y. However, 64 bit operations have greater flexibility. 64 bit instructions also include a TST field for accessing a Treg byte in a manner similar to the 32 bit operations discussed above. In that case, the side field S in the accessed Treg byte determines which condition codes (X or Y) are used. That is, the side field S determines both which condition codes are set pursuant to a 64 bit instruction being executed and, also, on which condition codes (X or Y) operation of the 64 bit instruction is predicated. Thus, this considerably increases the options available on the execution of 64 bit instructions.

It will be understood that a number of variations are possible to the embodiment described above. For example, the Side bit S in the Treg byte can be used always to denote the required set of condition codes (X or Y), rather than only in non-SIMD 64-bit instructions as mentioned above. Also, there is no need for a specific condition set flag S in the instruction—whether or not condition codes are to be set can be defined in the opcode or the instruction semantics can be such that condition codes are always set.

Considering FIG. 7, it is possible to implement conditional lane-by-lane execution in a number of ways. Another alternative to that described would be to perform the operation (and power-up the respective operators) only when the test condition is satisfied for that lane.

What is claimed is:

1. A method of conditionally executing instructions on operands, wherein the operands include a plurality of packed objects in respective lanes of the operand, the method comprising:

executing a first operation specified in a first instruction on lane objects of a first set of operands;

generating for each lane a condition code from the results of the execution of the first operation on the corresponding lane;

comparing a test register contained in a subsequent instruction against each of the condition codes; and executing a second operation specified in the subsequent instruction on lane objects of a second set of operands when the corresponding condition code matches the test register.

2. The method according to claim 1, wherein the first and second operands each include up to N packed objects.

3. The method according to claim 2, wherein N condition codes are generated following the execution of the first instruction.

4. The method according to claim 3, where the operands specified in the second instruction include less than N packed objects.

5. The method according to claim 1, wherein the first instruction and the subsequent instruction execute on the same execution channel of a computer system.

6. The method according to claim 1, wherein the first instruction and the subsequent instruction execute on separate execution channels of a computer system.

7. The method according to claim 6, wherein the condition codes generated by the first instruction are available to the subsequent instruction when executing on the same or on a different execution channel.

8. The method according to claim 1, wherein the condition codes are multibit condition codes allowing for a number of different conditions to be evaluated by the subsequent instruction.

9. The method according to claim 1, further comprising:

setting a condition setting indicator to indicate whether an instruction should generate condition codes.

10. The method according to claim 9, wherein said condition setting indicator is settable independently of the instruction.

11. The method according to claim 1, wherein a degree of packing of the first set of operands and a degree of packing of the second set of operands are equal.

12. The method according to claim 1, wherein a degree of packing of the first set of operands is greater than a degree of packing of the second set of operands.

13. The method according to claim 12, further comprising:

conditionally carrying out an operation specified in a fourth instruction on each lane of a set of operands specified in the fourth instruction depending on the results generated from executing either of the first or the subsequent instruction, or, either of the first or the third instruction, or, either of the subsequent or the third instruction.

14. The method according to claim 1, wherein a degree of packing of the first set of operands is less than a degree of packing of the second set of operands.

15. The method according to claim 1, further comprising:

conditionally carrying out an operation specified in a third instruction on each lane of a set of operands specified in the third instruction depending on the results generated from executing either of the first or the subsequent instruction.

* * * * *